Patented May 23, 1939

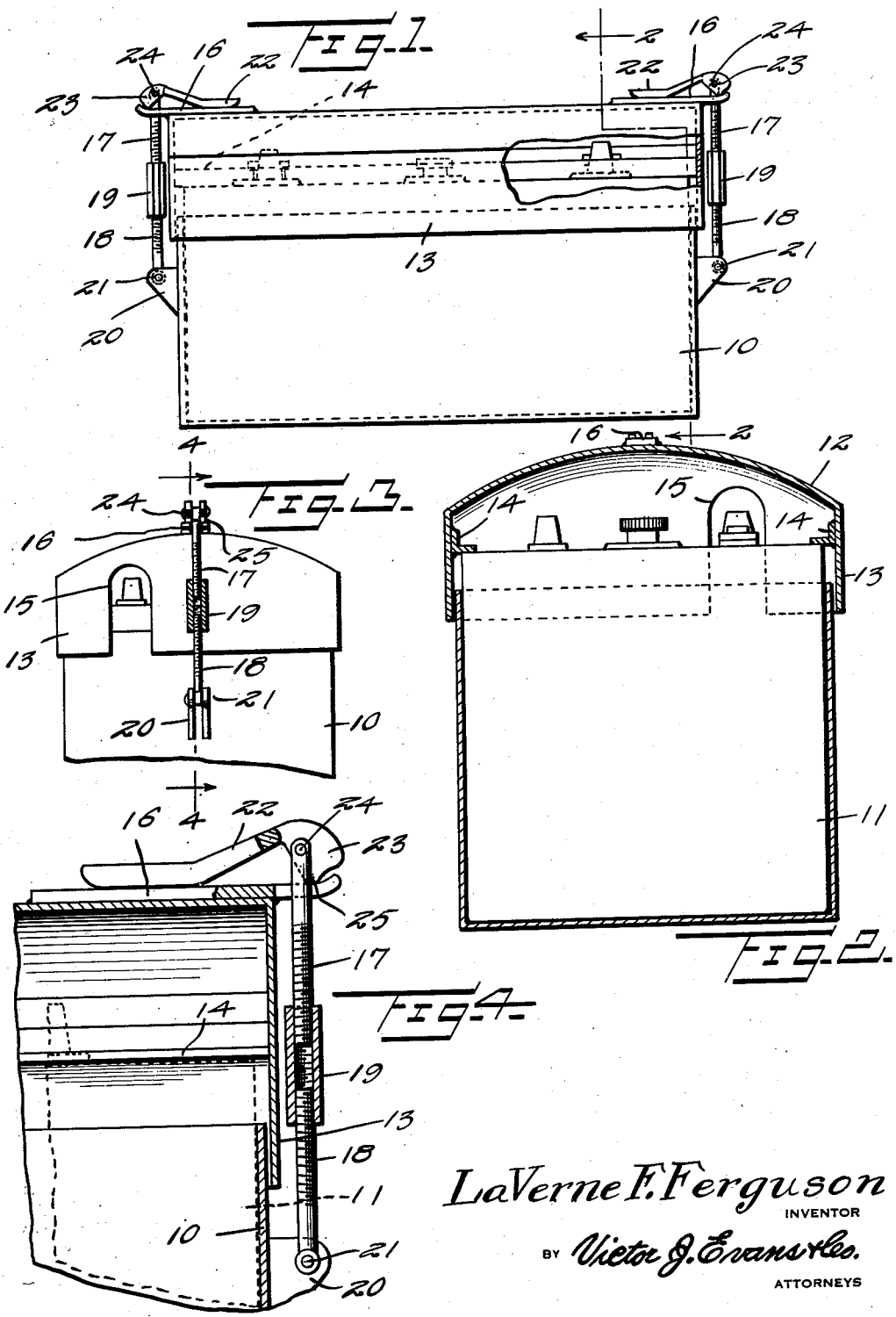

2,159,890

UNITED STATES PATENT OFFICE 2,159,890

BATTERY CASE FOR AUTOMOBILES

La Verne F. Ferguson, Pecatonica, Ill.

Application June 21, 1938, Serial No. 215,038

1 Claim. (Cl. 180—68.5)

This invention relates to battery cases for automobiles.

An object of the invention is to provide a container for a battery and a cover for the container adapted to loosely fit on the container and having a flange adapted to rest upon the top of the battery and serve as a brace for the cover and at the same time permit application and removal of the battery without special tools, and which in use will provide good protection for the battery.

A further object is to provide a battery case which will be formed of a few strong simple and parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification:

Figure 1 is a side elevation of a battery case constructed in accordance with the invention with parts broken away.

Figure 2 is a cross sectional view taken on the line 2—2 of Figure 1 looking in the direction of the arrows.

Figure 3 is a fragmentary end elevation of the battery case shown in Figure 1.

Figure 4 is an enlarged detail longitudinal sectional view taken on the line 4—4 of Figure 3.

Referring now to the drawing in which like characters of reference designate similar parts in the various views, 10 designates a box or container adapted to snugly receive a conventional storage battery 11. The container is provided with a cover 12 having a transversely arched top wall and having a flange 13 adapted to telescope loosely over the container 10. The flange 13 of the cover is provided on the sides or on the ends as desired, with angle iron bracket arms 14 which are preferably spot welded to the flange 13 and are adapted to engage the top of the battery 11 and perform the dual function of reinforcing the flange 13 of the cover against distortion and permitting easy application and removal of the cover.

The cover is provided with openings 15 in the flange 13 adapted to receive the battery terminal cables and preferably these openings are formed in the ends of the flange 13, although they may be formed in the sides of the flange 13 if desired.

For locking the cover 12 against dislodgement a pair of straps 16 are spot welded to the top of the cover at the ends thereof and the ends of these straps are bifurcated and project beyond the ends of the flange 13. A pair of oppositely threaded screws 17 and 18 are connected by a turnbuckle 19 and one of these screws is pivotally connected to hinge ears 20 which project from the container 10, through the medium of a pivot pin 21. The other screw is of sufficient length to project upwardly through the bifurcated end of the strap 16.

A lever 22 is provided with a cam head 23 which is pivotally connected through the medium of a pivot pin 24 through the upper end of a respective screw 17, as best shown in Fig. 4. The cam head is provided with a cam projection 25 which is eccentrically disposed with respect to the pivot pin 24 and which is adapted to forcibly press against the bifurcated end of the respective strap 16 when the lever 22 is rocked downwardly into engagement with the strap and firmly hold the bracket arms 14 down against the top of the battery.

From the above description it is thought that the construction and operation of the invention will be fully understood without further explanation.

What is claimed is:

A battery case comprising a container adapted to receive a battery, a cover for the container having a transversely arched top and having a marginal flange adapted to loosely telescope over the container, a pair of oppositely disposed angular brackets, secured to the inner face of said flange and adapted to support the cover upon the top of the battery, turnbuckle members hinged at the lower ends to the container and having the upper ends adapted to project above the top of the cover, bifurcated straps attached to and extending beyond the cover adapted to receive the upper ends of said members, and levers having cam heads pivotally secured to the turnbuckle members and adapted to engage said bifurcated ends of the straps and releasably latch the cover upon the container.

LA VERNE F. FERGUSON.